(12) United States Patent
Higashi et al.

(10) Patent No.: US 6,196,180 B1
(45) Date of Patent: Mar. 6, 2001

(54) IN-CYLINDER INJECTION TYPE SPARK IGNITION INTERNAL COMBUSTION ENGINE

(75) Inventors: Hirofumi Higashi, Okazaki; Yasuhiko Iwamoto, Otsu; Tateo Kume, Okazaki; Tetsuo Kataoka, Okazaki; Shinichi Murata, Okazaki; Kazuhiro Ichimoto, Nisshin; Kojiro Okada, Nagoya; Akihito Miyamoto, Chiryu, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/121,875

(22) Filed: Jul. 24, 1998

(30) Foreign Application Priority Data

Jul. 25, 1997 (JP) .................................... 9-200251

(51) Int. Cl.$^7$ ........................................................ F02F 7/00
(52) U.S. Cl. ...................................... 123/193.3; 123/193.5
(58) Field of Search .............................. 123/193.5, 193.3, 123/90.27, 302

(56) References Cited

U.S. PATENT DOCUMENTS

| 4,553,515 | * 11/1985 | King et al. ................ 123/90.4 |
| 4,858,573 | 8/1989 | Bothwell . |
| 5,305,720 | 4/1994 | Ando et al. . |

FOREIGN PATENT DOCUMENTS 5240044   9/1993   (JP) .

* cited by examiner

Primary Examiner—Marguerite McMahon

(57) ABSTRACT

In a SOHC type internal combustion engine having a single camshaft, a fuel injector is provided for directly injecting a fuel into a combustion chamber, and an intake port is provided such that one end of the intake port is open at intake openings to the combustion chamber. The intake port extends toward the top face of a cylinder head between the camshaft and two intake valves, such that at least a part of the intake port passes through a region between the shortest lines connecting respective head portions of the intake valves and the camshaft.

2 Claims, 6 Drawing Sheets

IN-CYLINDER INJECTION TYPE SPARK IGNITION INTERNAL COMBUSTION ENGINE

FIELD OF THE INVENTION

The present invention relates to an in-cylinder injection type spark ignition internal combustion engine installed in a motor vehicle, and in particular to a SOHC type in-cylinder injection gasoline engine.

BACKGROUND OF THE INVENTION

In the field of spark ignition type internal combustion engines installed in motor vehicles, various types of in-cylinder or direct injection type gasoline engines have been proposed in recent years, wherein a fuel is directly injected into a combustion chamber, instead of an intake pipe as in conventional engines, in an attempt to reduce harmful components of exhaust gases, and improve fuel economy. One example of such in-cylinder injection type gasoline engines is disclosed in U.S. Pat. No. 5,305,720 (Japanese Laid-open Patent Publication (Kokai) No. 5-240044).

In the in-cylinder injection gasoline engine disclosed in the above-identified publication, each intake port is formed as an upright port that extends substantially straight in a vertical direction, so that the air is sucked into a combustion chamber with a high intake or suction efficiency, so as to produce a swirl (reverse tumble flow) in the vertical direction within the combustion chamber. A cavity is formed in the top face of the piston. In operation, the fuel is injected from a fuel injector toward the cavity, for example, during a compression stroke, so that an air-fuel mixture whose air-fuel ratio is close to the stoichiometric ratio can be formed around a spark plug at an ignition timing, due to the swirl flowing across the bottom face of the cavity, even where the amount of the injected fuel is small.

Accordingly, the in-cylinder injection gasoline engine of the above type is able to successfully fire or ignite an air-fuel mixture even if it has a large air-fuel ratio as a whole, namely, the combustion chamber as a whole contains a fuel-lean air-fuel mixture, thus showing a high combustion efficiency. Further, the amount of discharge of harmful components of exhaust gases, such as carbon monoxide (CO) and hydrocarbon (HC), can be reduced, and the fuel economy can be improved mainly during idling of the engine or running of the vehicle with a low load.

The in-cylinder injection gasoline engine disclosed in the above-identified publication is provided by constructing a DOHC (double over head camshaft) type gasoline engine so that the fuel can be directly injected into the combustion chamber or cylinder.

However, the DOHC type gasoline engine is provided with two camshafts, and therefore suffers from a problem of relatively high manufacturing cost. The use of the two camshafts also results in an increase in the dimension of a cylinder head as measured in the width direction, which eventually results in an increase in the size of an engine body. If the size of the engine body is thus increased, the size of the engine as a whole cannot be reduced even if the in-cylinder injection gasoline engine has a relatively small displacement, thus making it difficult to install the engine on the vehicle.

In view of the above problem, it may be considered to construct an in-cylinder injection gasoline engine based on a SOHC (single over head camshaft) type gasoline engine that may have a reduced size and is available at a relatively low manufacturing cost, by providing the SOHC type engine with a fuel injection valve (injector) that is able to inject the fuel into the combustion chamber formed in the cylinder.

In this case, intake and exhaust ports, spark plug and other components of the SOHC type in-cylinder injection gasoline engine need to be located at appropriate positions relative to the single camshaft, so that the in-cylinder injection gasoline engine exhibits a high combustion efficiency that is equivalent to that of the DOHC type in-cylinder injection gasoline engine as described above.

SUMMARY OF THE INVENTION

It is therefore an object of the present invention to provide an in-cylinder injection type spark ignition internal combustion engine whose constituent components are located at appropriate positions when the engine is of a SOHC type, and which exhibits a high intake efficiency and combustion efficiency, and can be produced in reduced size.

To accomplish the above object, the present invention provides a four-valve type internal combustion engine of a SOHC type having a single camshaft, which is provided with a fuel injector capable of injecting a fuel directly into a combustion engine. Thus, even in the SOHC type internal combustion engine, the fuel is injected into each cylinder during a compression stroke, to be directed towards a spark plug, so that a fuel spray is concentrated at around the spark plug, to achieve stratified charge combustion in a desirable manner. This enables the engine to operate with a fuel-lean air-fuel mixture having a considerably large air-fuel ratio, thus assuring improved combustion efficiency and improved fuel economy.

In the SOHC type internal combustion engine according to the present invention, the intake port communicates at one end thereof with two openings that open to the combustion chamber, and at least a part of the intake port extends toward an upper surface of the cylinder head, so as to pass through a region between the shortest lines that connect distal ends of respective shaft portions of two valve members of one of the intake valve and exhaust valve, with the camshaft, as viewed in a direction of the axis of the cylinder. Namely, the intake port is disposed so as to extend between one of the intake valve and exhaust valve and the camshaft. Accordingly, the space in the cylinder head can be efficiently utilized, and a dimension of the internal combustion engine, as measured in its width direction, can be reduced, which leads to reduction in the size of the internal combustion engine. Further, the intake air can be introduced into the combustion chamber with a high suction efficiency, to flow in the vertical direction along the side wall of the cylinder, so that a swirl (reverse tumble flow) which rotates in the vertical direction can be favorably produced in the combustion chamber, thus assuring a further improved combustion efficiency. Thus, the four-valve type internal combustion engine of the SOHC type of the present invention is able to yield substantially the same effects as provided by known DOHC type in-cylinder injection gasoline engines.

In this connection, the intake port is preferably formed as an upright port that extends substantially in parallel with the axis of the cylinder. In this case, the dimension of the internal combustion engine, as measured in the width direction, can be further reduced, with a result of further reduction in the size of the internal combustion engine. Also, the intake air can be inducted into the combustion chamber with a further improved intake or suction efficiency, to flow in the vertical direction along the side wall of the cylinder, whereby the combustion efficiency of the engine can be further improved.

In one preferred form of the present invention, a spark plug is located to be exposed to a generally central portion of the combustion chamber, and an insertion hole that receives the spark plug extends through the cylinder head on the side opposite to the intake port, namely, extends between the other of the intake valve and exhaust valve and the camshaft. In this arrangement, the insertion hole for the spark plug as well as the intake port can be formed in a desirable fashion so that the spark plug is located at the optimum position, and the thus obtained in-cylinder injection type internal combustion engine exhibits not only an improved suction efficiency but also a significantly improved combustion efficiency, and can be produced in reduced size.

In another preferred form of the invention, the intake port consists of two independent port portions that respectively communicate with two intake openings formed at the lower surface of the cylinder head. In this case, a single rocker arm is rockably supported by a rocker shaft, for driving two valve members of each of the intake and exhaust valves, and therefore the size and weight of the rocker arm can be reduced. Further, the intake port can be favorably disposed between the intake valve and the camshaft, without interfering with the rocker arm.

If the intake port consists of two independent port portions as described above, the location of each port portion and the area of a passage provided by the port portion can be determined with a high degree of freedom. Namely, if two independent port portions are used, the intake port can be easily located at a suitable position and the area of the passage can be easily set so that the optimum intake or suction efficiency can be achieved.

In a further preferred form of the invention, the intake port is provided by a branch pipe that includes an upstream portion which consists of a single port portion, and a downstream portion which consists of two port portions diverging from the upstream, single port portion. The two port portions are directed at the two openings for communication therewith. In this case, a rocker arm which is rockably supported by a rocker shaft for driving two valve members of the intake valve is disposed so as to sandwich the single port portion of the intake port therebetween, as viewed in the direction of the axis of the cylinder. Thus, the intake port is favorably disposed between the intake valve and the camshaft, without interfering with the rocker arm.

If the intake port is constructed as a branch-pipe type port wherein two port portions diverge or bifurcate from a single port portion as described above, the area of a passage provided by the single port portion can be made relatively large, and the amount of intake air can be accordingly increased. Thus, the use of this type of intake port make it easy for the engine to operate with a fuel-lean air-fuel mixture having a large air-fuel ratio, where a large amount of intake air is required.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One preferred embodiment of the present invention will be described in detail with reference to the drawings.

Figure 1:
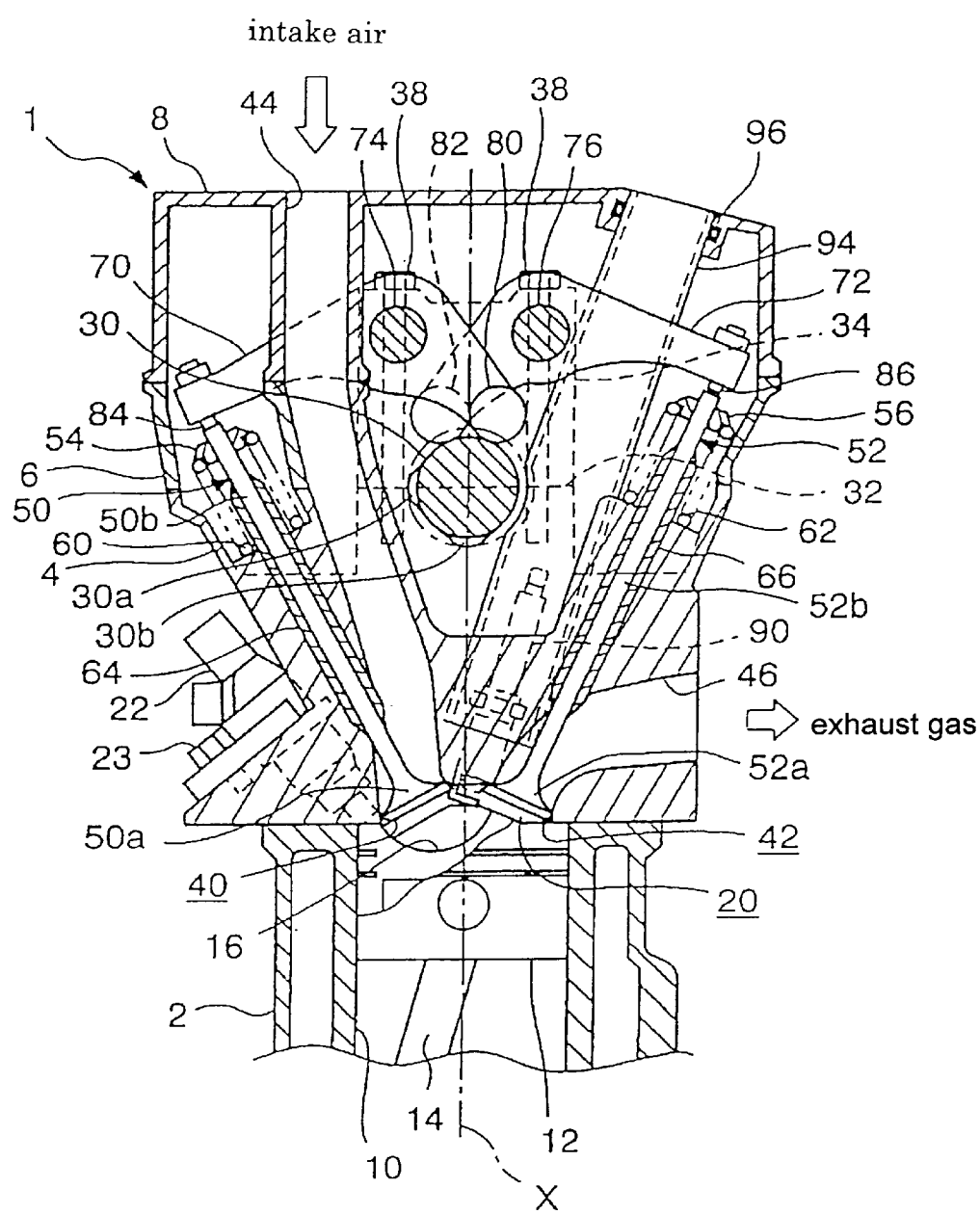
FIG. 1 is a vertical cross-sectional view showing one embodiment of the SOHC type in-cylinder injection gasoline engine of the present invention.
Figure 2:
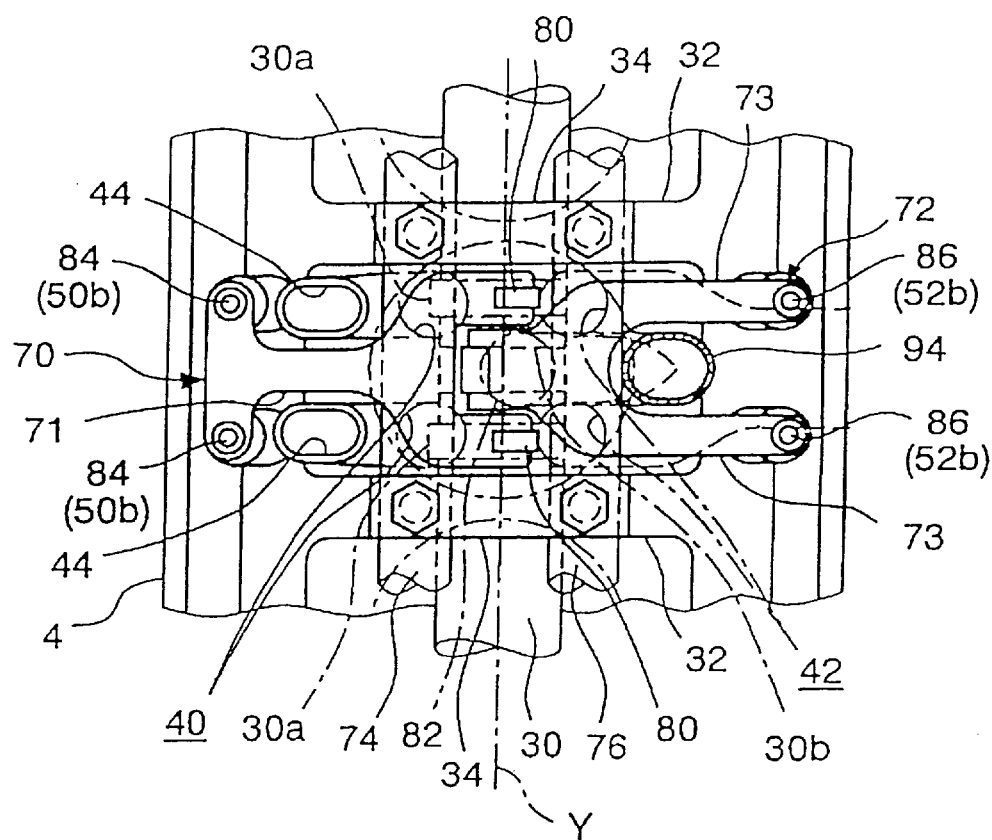
FIG. 2 is a top plan view showing the SOHC type in-cylinder injection gasoline engine when a rocker cover is removed from the engine.

FIG. 1 is a vertical cross-sectional view showing a SOHC (single over head camshaft) type in-cylinder injection gasoline engine of the present invention which is installed in an automotive vehicle. FIG. 2 is a top plan view of the in-cylinder injection gasoline engine from which a rocker cover is removed. Referring to FIG. 1 and FIG. 2, the construction of the SOHC type in-cylinder injection gasoline engine according to the present invention will be described in detail. The SOHC type in-cylinder injection gasoline engine may be, for example, a four-valve type, four-cylinder gasoline engine, wherein a fuel can be injected into all of the four cylinders during a compression stroke as well as a suction stroke. In the following, the structure and operation of one cylinder, out of the four cylinders, will be described as a typical example.

As shown in FIG. 1, the SOHC type in-cylinder injection gasoline engine (hereinafter, simply referred to as "engine") includes a cylinder block 2 and a cylinder head 4, an auxiliary cylinder head 6 and a rocker cover 8, both of which are mounted in this order on the cylinder head 4, as in a conventional gasoline engine. Corresponding ones of these components 2, 4, 6, and 8 are fixed to each other with bolts, or the like.

The cylinder block 2 includes a cylinder 10 having a cylindrical shape, and a piston 12 is fitted in the cylinder 10, as shown in FIG. 1. The piston 12 is connected to a crankshaft (not illustrated) via a connecting rod 14, such that the piston 12 slides and reciprocates in the cylinder 10 in accordance with the rotary motion of the crankshaft. A semi-spherical cavity 16 is formed in the top face of the piston 12, as in a known DOHC (double over head camshaft) type in-cylinder injection gasoline engine. The shape of the cavity 16 is similar to that of the known DOHC type in-cylinder injection gasoline engine, and therefore will not be described in detail in the present specification.

On the other hand, the cylinder head 4 is provided with a fuel injection valve (fuel injector) 22 which is able to directly inject the fuel into a combustion chamber 20 formed between the lower surface of the cylinder head 4 and the top face of the piston 12. More specifically, the fuel injector 22 is attached to the cylinder head 4 with a bolt 23, at a location in the vicinity of an outer circumferential wall of the cylinder 10. The fuel injector 22 forms a certain angle with respect to the center axis of the cylinder 10, namely, the cylinder axis X as indicated in FIG. 1, so that the fuel can be injected obliquely with respect to the cylinder axis X. The angle formed by the fuel injector 22 and the cylinder axis X is determined such that the fuel injected from the fuel injector 22 is guided along a semi-spherical bottom wall of the cavity 16 when the piston 12 is located at around its top dead center. The effective fuel injection pressure of the fuel injector 22 is set to a high level (for example, 50 kgf/cm$^2$ or higher) so that the injector 22 is able to suitably supply the fuel into the cylinder 10 not only during a suction stroke, but also during a compression stroke in which the pressure within the combustion chamber 20 becomes considerably high.

A camshaft 30 is rotatably supported by the cylinder head 4, so as to extend along a center line Y (as indicated in FIG. 2) of the engine 1 connecting respective center axes of the cylinders. More specifically, the camshaft 30 is supported on a plurality of shaft supporting portions 32 that are formed between adjacent cylinders and at the opposite end portions of the cylinder head 4. The camshaft 30 is also gripped or held by cam caps 34 corresponding to these support portions 32, such that the cam shaft is rotatably supported by the cylinder head 4. Each of the cam caps 34 is respectively fixed to the corresponding support portion 32 by means of a pair of bolts 38, 38.

The cylinder head 4 is formed with a pair of intake ports (two port portions) 44, 44 on one side of a base plane which includes the above-indicated cylinder axis X and the center line Y, and a pair of exhaust ports 46, 46 on the other side of the base plane. The intake ports 44, 44 are open to the combustion chamber 20 at a pair of intake openings 40, 40 formed on the above-indicated one side of the base plane, and the exhaust ports 46, 46 are open to the combustion chamber 20 at a pair of exhaust openings 42, 42 formed on the other side of the base plane. The intake openings 40, 40 are respectively provided with a pair of intake valves (two valve members) 50, 50 which are placed in a selected one of a first position in which the intake ports 44, 44 are held in communication with the combustion chamber 20, and a second position in which the intake ports 44, 44 are shut off from the chamber 20. On the other hand, the exhaust openings 42, 42 are provided with a pair of exhaust valves 52, 52 which are placed in a selected one of a first position in which the exhaust ports 46, 46 are held in communication with the combustion chamber 20, and a second position in which the exhaust ports 46, 46 are shut off from the chamber 20.

The intake valves 50, 50 and the exhaust valves 52, 52 are disposed in the cylinder head 4 on the opposite sides of the base plane including the cylinder axis X and the center line Y, with certain positional relationship with the intake ports 44, 44 and exhaust ports 46, 46, as shown in FIG. 1. More specifically, the intake valves 50, 50 and exhaust valves 52, 52, respectively, form certain angles with respect to the base plane, and shaft portions 50$b$, 50$b$ formed integrally with valve bodies 50$a$, 50$a$ of the intake valves 50, 50, and shaft portions 52$a$, 52$b$ formed integrally with valve bodies 52$a$, 52$b$ of the exhaust valves 52, 52 extend through the cylinder head 4 toward the upper face of the cylinder head 4, with the distance between the shaft portions 50$b$, 50$b$ and the shaft portions 52$b$, 52$b$ increasing as they approach the upper face of the cylinder head 4.

The intake valves 50, 50 and exhaust valves 52, 52 are constructed similarly to those generally used in conventional internal combustion engines. Specifically, spring seats 54, 54 and spring seats 56, 56 are respectively provided at head portions of the intake valves 50, 50 and exhaust valves 52, 52, namely, at distal end portions of the shaft portions 50$b$, 50$b$ and shaft portions 52$b$, 52$b$. Further, coil springs 60, 60, 62, 62 are disposed in a contracted state between the respective spring seats 54, 54, 56, 56 and constituent members of the cylinder head 4, so as to fit on the intake valves 50, 50 and exhaust valves 52, 52, respectively. With this arrangement, the intake valves 50, 50 and exhaust valves 52, 52 are biased by the coil springs 60, 60 and 62, 62, respectively, so as to be normally held in positions for closing the intake openings 40, 40 and exhaust openings 42, 42. In FIG. 1, reference numerals 64, 66 denote valve guides of the intake valves 50 and exhaust valves 52, respectively. The intake valves 50, 50 and exhaust valves 52, 52 can smoothly slide along the valve guides 64, 66 in the cylinder head 4, with certain angles with respect to the base plane as described above, so that the intake and exhaust valves 50, 52 can be opened and closed as desired with high reliability.

The camshaft 30 is formed with a pair of cam portions 30$a$, 30$a$ and a cam portion 30$b$ that correspond to the intake valves 50, 50 and the exhaust valves 52, 52, respectively. Also, a rocker arm 70 is provided between these cam portions 30$a$, 30$a$ and the intake valves 50, 50, and a rocker arm 72 is provided between the cam portion 30$b$ and the exhaust valves 52, 52.

More specifically, a rocker shaft 74 and a rocker shaft 76 are supported by the cam cap 34 to extend in parallel with the camshaft 30, and the rocker arm 70 and the rocker arm 72 are respectively supported by the rocker shaft 74 and the rocker shaft 76, such that the rocker arms 70, 72 can freely rock or rotate about these shafts 74, 76. Described with respect to the rocker arm 70, a pair of rollers 80, 80 provided at one end of the rocker arm 70 abut on the cam portions 30$a$, 30$a$, while distal ends of a pair of valve adjusters 84, 84 provided at the other end of the rocker arm 70 abut on head portions of the intake valves 50, 50, respectively. Described with respect to the rocker arm 72, a roller 82 provided at one end of the rocker arm 72 abuts on the cam portion 30$b$, while distal ends of a pair of valve adjusters 86, 86 provided at the other end of the rocker arm 72 abut on head portions of the exhaust valve 52, 52, respectively.

With the above arrangement, as the camshaft 30 rotates, the rocker arms 70, 72 rock about the rocker shafts 74, 76 in accordance with the shapes of the cam portions 30$a$ and cam portion 30$b$. As a result, the intake valves 50, 50 and exhaust valves 52, 52 are opened against the bias force of the coil springs 60, 60 and coil springs 62, 62 when the rollers 80, 82 come into contact with the cam portions 30$a$, 30$b$, and then closed due to the bias force when the camshaft 30 is further rotated.

The intake ports 44, 44 will be now described in detail. As shown in FIG. 1, the intake ports 44, 44 extend from the intake openings 40, 40 toward the upper face of the cylinder head 4 substantially parallel to the cylinder axis X, while the exhaust ports 46, 46 extend substantially in the horizontal direction to be open to one side face of the cylinder head 4. Namely, the intake ports 44, 44 are formed substantially straight and perpendicular to the lower face of the cylinder head 4. More specifically, the upstream portions of the intake ports 44, 44 remote from the intake openings 40, 40 are shaped in slightly S-like shape, so as to extend between the intake valves 50, 50 and the camshaft 30 and rocker shaft 74, and the upper ends of the ports 44, 44 are respectively open onto the upper face of rocker cover 8. As is apparent from FIG. 2, the intake ports 44, 44 extend between the intake valves 50, 50 and the camshaft 30, such that at least a part of each intake port 44 passes through a region between the shortest lines connecting the distal ends of the respective shaft portions 50b, 50b of the intake valves 50, 50 and the camshaft 30, namely, a region between normals that are extended from distal ends of the respective shaft portions 50b, 50b to the camshaft 30, as viewed in the direction of the cylinder axis X.

If the intake ports 44, 44 are formed straight in the vertical direction, as described above, a problem of interference between the intake ports 44, 44 and the rocker arm 70 may arise in general cases. In the engine 1 of the present embodiment, however, the rocker arm 70 is formed in T-like shape, as shown in FIG. 2. Accordingly, the intake ports 44, 44 are located on the opposite sides of a middle, narrowed portion 71 of the rocker arm 70, and therefore the engine 1 can advantageously avoid the interference between the intake ports 44, 44 and the rocker arm 70.

A spark plug 90 is also attached to the cylinder head 4, such that its spark generating portion protrudes at substantially the center of the combustion chamber 20, namely, at a firing position where an air-fuel mixture in the combustion chamber 20 can be most effectively burned. More specifically, the spark plug 90 is attached to the cylinder head 4 at a given angle with respect to the cylinder axis X, as shown in FIG. 1, and the angle formed between the spark plug 90 and the cylinder axis X is determined so that the spark plug 90 can be inserted between the exhaust valves 52, 52 and the camshaft 30 and rocker shaft 76 when it is mounted in the cylinder head 4. Referring to FIG. 1, a straight tube, or guide tube 94 is provided which functions as a guide for insertion of the spark plug 90, and also serves to prevent a lubricant oil scattered in the cylinder head 4 from contacting with the spark plug 90. The guide tube 94 is inserted at the above-indicated given angle between the exhaust valves 52, 52 and the camshaft 30 and rocker shaft 76, to be fixed to a constituent member of the cylinder head 4. More specifically, as is apparent from FIG. 2, the guide tube 94 is disposed between the exhaust valves 52, 52 and the camshaft 30 so as to pass through a region between the shortest lines connecting the distal ends of the respective shaft portions 52b, 52b of the exhaust valves 52, 52 and the camshaft 30, namely, a region between normals that are extended from the distal ends of the shaft portions 52b, 52b to the camshaft 30, as viewed in the direction of the cylinder axis X.

In this case, too, the guide tube 94 is formed substantially straight and perpendicular to the lower face of the cylinder head 4, and there may arise a problem of interference between the guide tube 94 and the rocker arm 72, as in the case of the intake ports 44, 44. In the present embodiment, however, the rocker arm 72 is formed in Y-like shape, as shown in FIG. 2. Accordingly, the guide tube 94 is disposed between a pair of arm portions 73, 73 of the Y-shaped rocker arm 72, without interfering with the arm 72, and therefore the engine 1 can advantageously avoid the interference between the guide tube 94 and the rocker arm 72. As shown in FIG. 1, the upper end of the guide tube 94 is detachably fitted in the rocker cover 8 via an oil seal 96.

Figure 3:
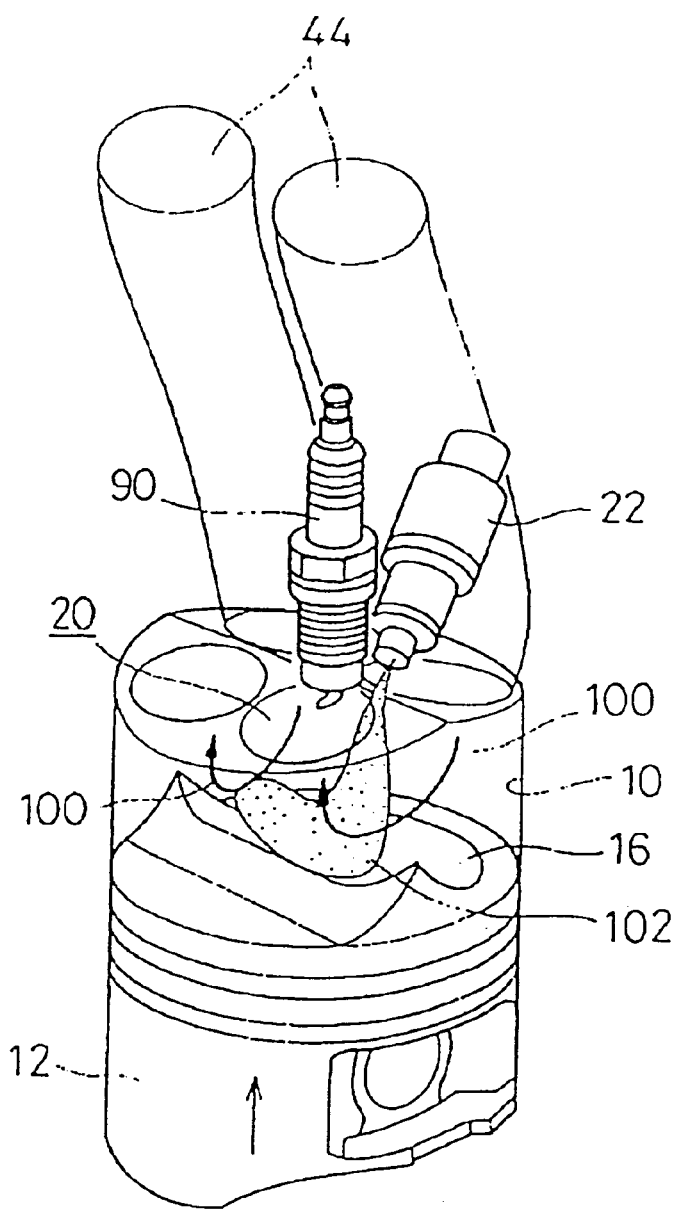
FIG. 3 is a view explaining the operation and effects of the SOHC type in-cylinder injection gasoline engine of the present invention.

The operation and effects of the SOHC type in-cylinder injection gasoline engine provided with the upright intake ports 44, 44 as described above will be described with reference to FIG. 3. Here, the case where the fuel is injected during a compression stroke will be explained by way of example.

In the arrangement in which the intake ports 44, 44 are formed substantially straight in the vertical direction along the cylinder axis X, when the air is sucked through the intake ports 44, 44 as the piston 12 is lowered during a suction stroke, the intake air enters the combustion chamber 20 along a side wall of the cylinder 10. Since the intake ports 44, 44 extend substantially straight while only slightly curving, the intake air can be inducted or introduced into the combustion chamber 20 with a considerably high induction efficiency.

The suction stroke is then followed by a compression stroke during which the piston 12 is elevated, namely, moved to its top end center. As the piston 12 is elevated, the intake air is swirled up along the semi-spherical bottom wall of the cavity 16 formed at the top face of the piston 12. At this time, the intake air flows in the vertical direction within the cylinder 10, while turning around from the side wall to the central portion of the cylinder as indicated by arrows in FIG. 3, to thus form a swirl-like reverse tumble flow 100 that rotates in the cavity 16. When the piston 12 almost reaches the top dead center, the fuel is injected from the fuel injector 22, and is guided along the semi-spherical bottom wall of the cavity 16, namely, in the same direction as the reverse tumble flow 100. As a result, the fuel is mixed with the intake air in the cavity 16, as desired, to provide a fuel spray 102, which reaches the spark plug 90 in a favorable condition.

If the fuel, which has been substantially enclosed in the cavity 16 together with the reverse tumble flow 100 and held in a stratified state, reaches the spark plug 90, the air-fuel mixture formed in the vicinity of the spark plug 90 has a relatively low air-fuel ratio (stoichiometric ratio or lower ratio), namely, a fuel-rich mixture is formed around the spark plug 90, even if only a small amount of the fuel is injected into the combustion chamber 20, and the chamber 20 as a whole contains a fuel-lean mixture having a high air-fuel ratio. Accordingly, when the piston 12 comes further closer to the top dead center in this state, the spark plug 90 is turned on to ignite the air-fuel mixture, showing a good firing characteristic around the spark plug 90, to thus achieve considerably favorable and efficient stratified charge combustion, without suffering from a failure in firing due to the presence of the fuel-lean mixture in the chamber 20. In this regard, the operation and effects in relation to the stratified charge combustion have been clarified or understood in the case of known DOHC type in-cylinder injection gasoline engines, and therefore will not be described in detail in this specification.

Consequently, the SOHC type in-cylinder injection gasoline engine can provide an improved combustion efficiency and reduce harmful exhaust-gas components, such as hydrocarbon (HC) and carbon monoxide (CO), as in the case of known DOHC type in-cylinder injection gasoline engines, while assuring substantially the same output as general SOHC type gasoline engines of intake pipe injection type in which the fuel is injected into an intake pipe. Further, the amount of consumption of the fuel can be reduced to the minimum, and the fuel economy of the engine can be improved.

While the fuel is injected during a compression stroke in the example described above, the use of the intake ports 44, 44 is also effective and advantageous in the case where the fuel is injected during a suction stroke. Namely, the use of the upright intake ports 44, 44 leads to an improved intake or suction efficiency with which the air is sucked to produce the reverse tumble flow 100, and is thus highly effective to produce a uniform air-fuel mixture. Thus, even in the case where only a small amount of the fuel is injected during the suction stroke to operate the engine at a large air-fuel ratio, for example, it is possible to advantageously produce an air-fuel mixture that is suitable for combustion, and therefore the combustion efficiency and fuel economy can be naturally improved.

Figure 4:
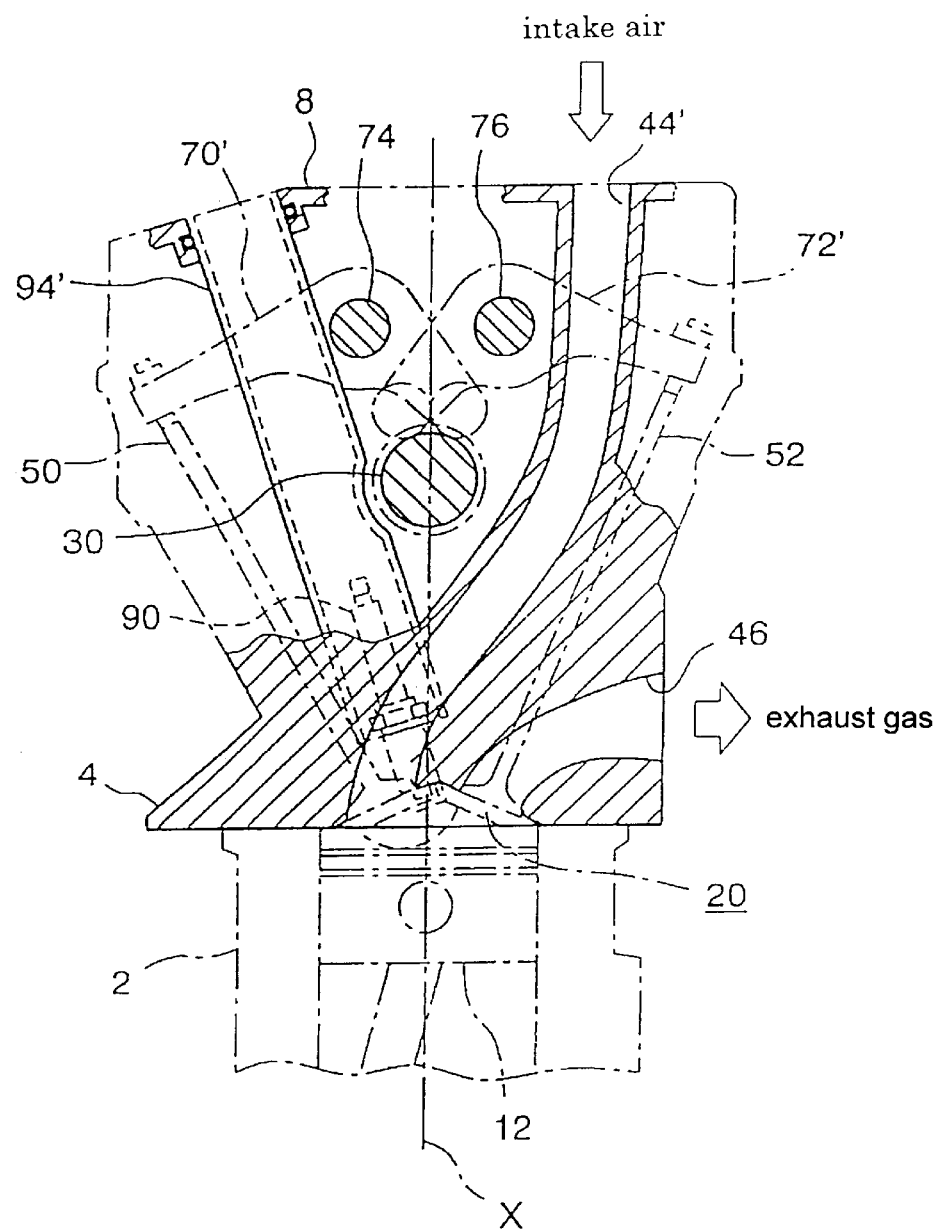
FIG. 4 is a schematic view showing another embodiment of the SOHC type in-cylinder injection gasoline engine of the present invention.

Referring next to FIG. 4, another embodiment of the SOHC type in-cylinder injection gasoline engine according to the present invention will be now described.

In this embodiment, the position of the intake ports and the position of the guide tube for the spark plug are reversed as shown in FIG. 4, as compared with those of the previous embodiment shown in FIG. 1. Namely, intake ports 44', 44' are formed along a slightly S-shaped curve to extend between the exhaust valves 52, 52 and the camshaft 30 and rocker shaft 76. On the other hand, the guide tube 94' extends between the intake valves 50, 50, and the camshaft 30 and rocker shaft 74, to be fixed to a constituent member of the cylinder head 4.

With the intake ports 44', 44' and the guide tube 94' thus arranged, the rocker arm 70' is formed in Y-like shape similarly to the rocker arm 72 shown in FIG. 2, and the rocker arm 72' is formed in T-like shape similarly to the rocker arm 70 shown in FIG. 2.

With this arrangement, the intake ports 44', 44' and the guide tube 94' are suitably positioned in the cylinder head 44 without interfering with the rocker arm 70' and the rocker arm 72', and the intake ports 44', 44' are formed substantially straight in a vertical direction, so that the engine operates in a similar manner to the previous embodiment so as to provide similar effects.

Figure 5:
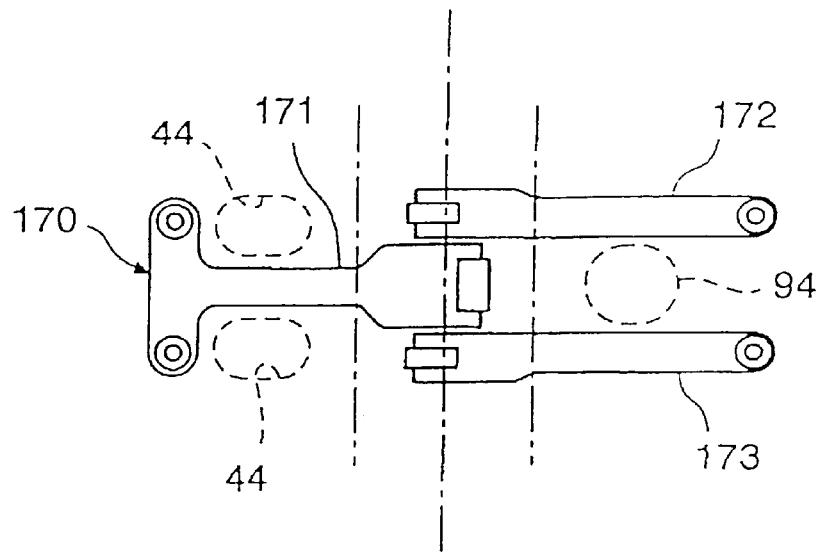
FIG. 5 is a view showing a modified example of rocker arms used in the SOHC type in-cylinder injection gasoline engine according to the present invention.
Figure 6:
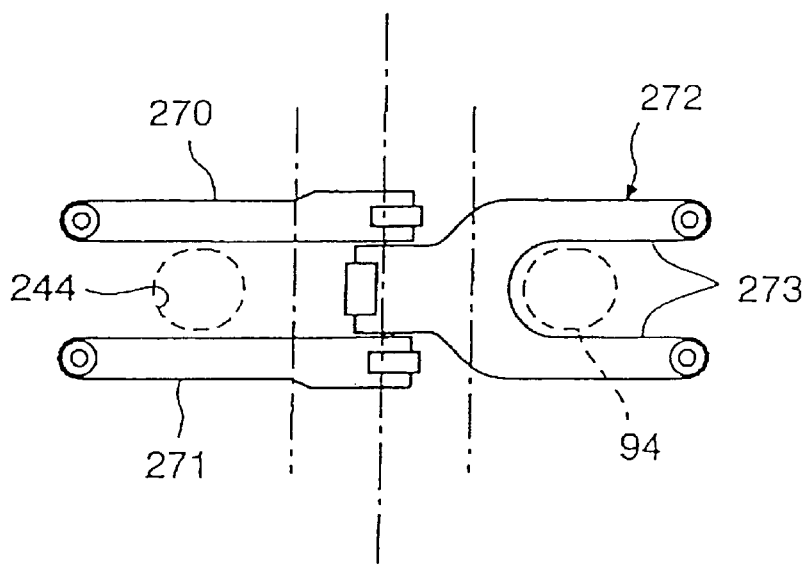
FIG. 6 is a view showing another modified example of rocker arms which are used when a branch-pipe type intake port is employed.
Figure 7:
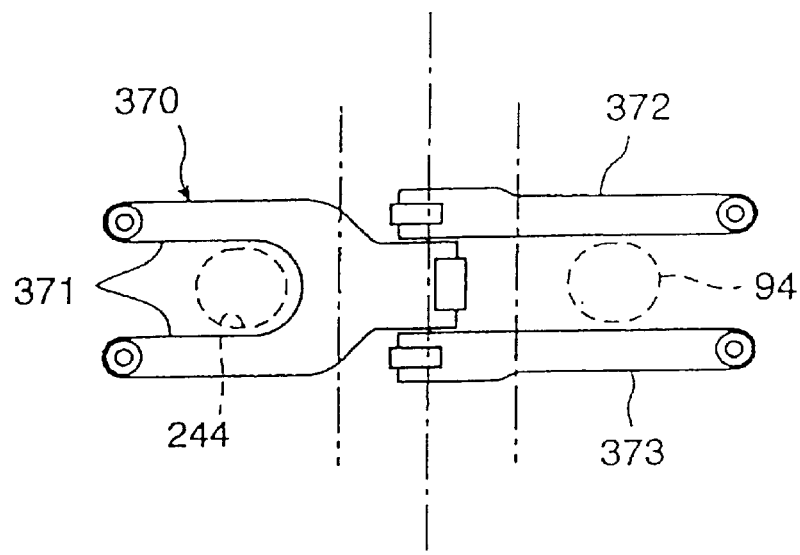
FIG. 7 is view showing another modified example of rocker arms used when the branch-pipe type intake port is employed.

Referring to FIG. 5 through FIG. 7, some modified examples of the rocker arm 70 and rocker arm 72 of FIG. 2 (or the rocker arm 70' and rocker arm 72') will be now described.

In the modified example shown in FIG. 5, the rocker arm 170 for operating the intake valves 50, 50 is formed in T-like shape, as in the case of FIG. 2, while two rocker arms 172, 173 are provided for operating the exhaust valves 52, 52, respectively.

With this arrangement, the intake ports 44, 44 can be suitably disposed on the opposite sides of a middle, narrowed portion 171 of the T-shaped rocker arm 170 as in the previous embodiment, without causing interference between the ports 44, 44 and the rocker arm 170, and the guide tube 94 is suitably disposed between the rocker arms 172, 173 without causing interference between the guide tube 94 and the rocker arms 172, 173.

Figure 8:
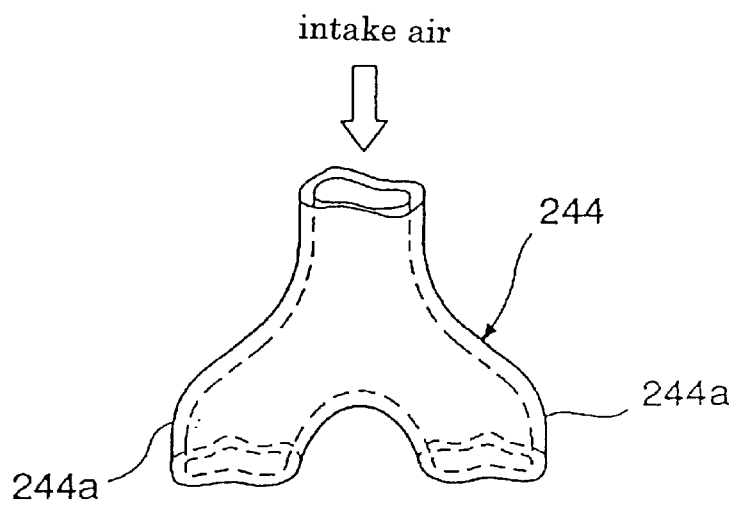
FIG. 8 is a schematic view showing an intake port of branch-pipe type.

In the meantime, a branch-pipe type intake port 244 as shown in FIG. 8 may be employed in place of the intake ports 44, 44. The intake port 244 is provided by a branch pipe, which bifurcates or diverges into a pair of branches (two port portions) 244a, 244a at the down-stream position closer to the cylinder block 2 that to the camshaft 30, and distal ends of the branches 244a, 244a communicate with the intake openings 40, 40, respectively. Namely, the intake port 244 is disposed along the cylinder axis X similarly to the intake ports 44, 44 of the first embodiment, such that the branches 244a, 244a converge at a position in the vicinity of the rocker arm on the upstream side, to provide a single intake port portion.

Where two independent intake ports, such as the intake ports 44, 44 of the first embodiment, are provided, each of the intake ports can be designed and positioned with an increased degree of freedom. If the intake port 244 in the form of a branch pipe, as described above, is employed, on the other hand, the area of a passage provided by an upstream, converged portion of the intake port 244 can be set to a relatively large value, and an increased amount of intake air can be advantageously inducted through the intake port 244. The increase in the amount of the intake air is advantageous when the engine is operated with a fuel-lean mixture having a large air-fuel ratio, where an increased amount of the air is required.

When the intake port 244 in the form of a branch pipe, as described above, is used in the engine 1, modified examples of rocker arms, as shown in FIG. 6 and FIG. 7, may be employed.

In the modified example, as shown in FIG. 6, two rocker arms 270, 271 are provided for operating the intake valves 50, 50, while a rocker arm 272 for operating the exhaust pipes 52, 52 is formed in Y-like shape as in the case of FIG. 2 as described above.

With this arrangement, the intake port 244 can be suitably disposed between the rocker arms 270, 271 without causing interference between the intake port 244 and the rocker arms 270, 271, and the guide tube 94 is suitably disposed between a pair of arm portions 273, 273 of the rocker arm 272 without causing interference between the guide tube 94 and the rocker arm 272, as in the case of FIG. 2 as described above.

In the modified example, as shown in FIG. 7, a rocker arm 270 for operating the intake valves 50, 50 is formed in Y-like shape, while two rocker arms 372, 373 are provided for operating the exhaust valves 52, 52.

With this arrangement, the intake port 244 can be suitably disposed between a pair of arm portions 371, 371 of the rocker arm 370 without causing interference between the intake port 244 and the rocker arm 370, while the guide tube 94 is suitably disposed between the rocker arms 372, 373 without causing interference between the guide tube 94 and the rocker arms 372, 373.

As described above with respect to the second embodiment and modified examples, the SOHC type in-cylinder injection gasoline engine according to the present invention is constructed such that the fuel injector 22 and the spark plug 90 are disposed at suitable locations, and such that the intake ports 44, 44 or intake pipe 244 are/is suitably formed substantially straight in a vertical direction, to extend along the cylinder axis X toward the rocker cover 8, without interfering with the rocker arm(s).

Accordingly, even with the SOHC type internal combustion engine, the intake air can be smoothly sucked during a suction stroke with a high intake or suction efficiency, through the upright intake ports 44, 44 or intake port 244, to flow into the combustion chamber 20 along the side wall of the cylinder 10, and, when the piston 12 is elevated during a compression stroke, the reverse tumble flow 100 can be favorably produced in the cavity 16 formed in the top face of the piston 12. When the fuel is injected during the compression stroke, in particular, the fuel spray 102, which has been kept in the cavity 16 in a suitable condition, can be directed and concentrated at around the spark plug 90 with the air-fuel ratio being kept sufficiently small, whereby stratified charge combustion can be realized in a considerably desirable manner, without causing a failure in firing or other problem. Thus, the SOHC type in-cylinder injection gasoline engine exhibits a considerably high combustion efficiency while reducing the amount of consumption of the fuel, thus assuring improved fuel economy while reducing harmful components of exhaust gases.

In the arrangement in which the upright intake ports 44, 44 or intake port 244 are/is provided by effectively utilizing the space between the intake valves 50, 50 and the camshaft 30 and rocker shaft 74, the dimension of the cylinder head 4 as measured in the width direction can be reduced, with a result of reduction in the size of the engine 1.

Thus, the use of the SOHC type in-cylinder injection gasoline engine according to the present invention leads to further reduction in the manufacturing cost and reduction in the size of the engine owing to the SOHC structure, while achieving reduced pollution and reduced consumption of the fuel as in the known DOHC type in-cylinder injection gasoline engine.

While SOHC in-cylinder injection gasoline engines of four-valve type have been described above in the illustrated embodiments, the present invention is not limited to this type of engine, but may be suitably applied to a SOHC type in-cylinder injection gasoline engine of two-valve type which includes only one intake port and one exhaust port. Such two-valve type engines may be provided by further modifying the rocker arms that are shown as the modified examples in FIG. 6 and FIG. 7. In this case, if the intake port is disposed such that at least the cross section of the passage on the upstream side of the intake port extends in perpendicular to the shortest line connecting a head portion of the intake valve or exhaust valve (the distal end of a shaft portion of one of the intake valve and exhaust valve) and the camshaft, the resulting SOHC type in-cylinder injection gasoline engine exhibits a high intake efficiency, and the size of the engine can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-cylinder injection type spark ignition internal combustion engine, comprising:

a combustion chamber formed between a lower surface of a cylinder head and a top face of a piston inserted in a cylinder, said lower surface of the cylinder head having a first intake opening and a second intake opening and a first exhaust opening and a second exhaust opening, said first and second intake openings being located on one side of and along a plane including an axis of the cylinder and said first and second exhaust openings being located on the other side of and along said plane;

a fuel injector which directly injects a fuel into said combustion chamber;

a spark plug provided in said cylinder head such that a portion of the spark plug protrudes into said combustion chamber;

an intake port having one end that communicates with said first and second intake openings, said intake port extending through said cylinder head toward an upper surface of the cylinder head;

an exhaust port having one end that communicates with said first and second exhaust openings, said exhaust port extending through said cylinder head toward a side face of the cylinder head;

a first intake valve including a valve body that opens and closes said first intake opening, and a shaft portion formed integrally with the valve body, said first intake valve being placed in a selected one of a first position in which the intake port is held in communication with the combustion chamber such that intake air is allowed to flow into the combustion chamber, and a second position in which the intake port is shut off from the combustion chamber such that the intake air is inhibited from flowing into the combustion chamber;

a second intake valve including a valve body that opens and closes said second intake opening, and a shaft portion formed integrally with the valve body, said second intake valve being placed in a selected one of the first and second positions;

a first exhaust valve including a valve body that opens and closes said first exhaust opening, and a shaft portion formed integrally with the valve body, said first exhaust valve being located in a substantially symmetrical relationship with said first intake valve with respect to said plane, said first exhaust valve being placed in a selected one of a third position in which the exhaust port is held in communication with the combustion chamber such that an exhaust gas is allowed to be discharged from the combustion chamber, and a fourth position in which the exhaust port is shut off from the combustion chamber such that the exhaust gas is inhibited from being discharged from the combustion chamber;

a second exhaust valve including a valve body that opens and closes said second exhaust opening, and a shaft portion formed integrally with the valve body, said second exhaust valve being located in a substantially symmetrical relationship with said second intake valve with respect to said plane, said second exhaust valve being placed in a selected one of the third and fourth positions;

a single camshaft including a plurality of cam portions which respectively drive said first and second intake valves and said first and second exhaust valves to open and close the first and second intake valves and the first and second exhaust valves, said camshaft being supported by said cylinder head and extending substantially in parallel with said plane;

a rocker shaft that extends substantially in parallel with said camshaft; and a rocker arm that is rockably supported by the rocker shaft such that one end of the rocker arm abuts the distal end of each shaft portion of said first and second intake valves and the other end of the rocker arm abuts the camshaft for contact with the cam portions, said first and second intake valves being driven by said camshaft via said rocker arm so as to be selectively opened and closed, wherein at least a part of said intake port extends through one of a first region defined by a first shortest line connecting a distal end of the shaft portion of said first intake valve and said camshaft and a second shortest line connecting a distal end of the shaft portion of the second intake valve and said camshaft, and a second region defined by a third shortest line connecting a distal end of the shaft portion of said first exhaust valve and said camshaft and a fourth shortest line connecting a distal end of the shaft portion of said second exhaust valve and said camshaft, as viewed in a direction of the axis of the cylinder, and wherein said intake port includes two independent port portions that respectively communicate with said first and second intake openings, and said rocker arm extends between said two port portions as viewed in the direction of the axis of the cylinder.

2. An in-cylinder injection type spark ignition internal combustion engine, comprising:

a combustion chamber formed between a lower surface of a cylinder head and a top face of a piston inserted in a cylinder, said lower surface of the cylinder head having a first intake opening and a second intake opening and a first exhaust opening and a second exhaust opening, said first and second intake openings being located on one side of and along a plane including an axis of the cylinder and said first and second exhaust openings being located on the other side of and along said plane;

a fuel injector which directly injects a fuel into said combustion chamber;

a spark plug provided in said cylinder head such that a portion of the spark plug protrudes into said combustion chamber;

an intake port having one end that communicates with said first and second intake openings, said intake port extending through said cylinder head toward an upper surface of the cylinder head;

an exhaust port having one end that communicates with said first and second exhaust openings, said exhaust port extending through said cylinder head toward a side face of the cylinder head;

a first intake valve including a valve body that opens and closes said first intake opening, and a shaft portion formed integrally with the valve body, said first intake valve being placed in a selected one of a first position in which the intake port is held in communication with the combustion chamber such that intake air is allowed to flow into the combustion chamber, and a second position in which the intake port is shut off from the combustion chamber such that the intake air is inhibited from flowing into the combustion chamber;

a second intake valve including a valve body that opens and closes said second intake opening, and a shaft portion formed integrally with the valve body, said second intake valve being placed in a selected one of the first and second positions;

a first exhaust valve including a valve body that opens and closes said first exhaust opening, and a shaft portion formed integrally with the valve body, said first exhaust valve being located in a substantially symmetrical relationship with said first intake valve with respect to said plane, said first exhaust valve being placed in a selected one of a third position in which the exhaust port is held in communication with the combustion chamber such that an exhaust gas is allowed to be discharged from the combustion chamber, and a fourth position in which the exhaust port is shut off from the combustion chamber such that the exhaust gas is inhibited from being discharged from the combustion chamber;

a second exhaust valve including a valve body that opens and closes said second exhaust opening, and a shaft portion formed integrally with the valve body, said second exhaust valve being located in a substantially symmetrical relationship with said second intake valve with respect to said plane, said second exhaust valve being placed in a selected one of the third and fourth positions;

a single camshaft including a plurality of cam portions which respectively drive said first and second intake valves and said first and second exhaust valves to open and close the first and second intake valves and the first and second exhaust valves, said camshaft being supported by said cylinder head and extending substantially in parallel with said plane;

a rocker shaft that extends substantially in parallel with said camshaft; and a rocker arm that is rockably supported by the rocker shaft such that one end of the rocker arm abuts the distal end of each shaft portion of said first and second exhaust valves and the other end of the rocker arm abuts the camshaft for contact with the cam portions, said first and second exhaust valves being driven by said camshaft via said rocker arm so as to be selectively opened and closed, wherein at least a part of said intake port extends through one of a first region defined by a first shortest line connecting a distal end of the shaft portion of said first intake valve and said camshaft and a second shortest line connecting a distal end of the shaft portion of the second intake valve and said camshaft, and a second region defined by a third shortest line connecting a distal end of the shaft portion of said first exhaust valve and said camshaft and a fourth shortest line connecting a distal end of the shaft portion of said second exhaust valve and said camshaft, as viewed in a direction of the axis of the cylinder, and wherein said intake port includes two independent port portions that respectively communicate with said first and second intake openings, and said rocker arm extends between said two port portions as viewed in the direction of the axis of the cylinder.

* * * * *